Figure 1:
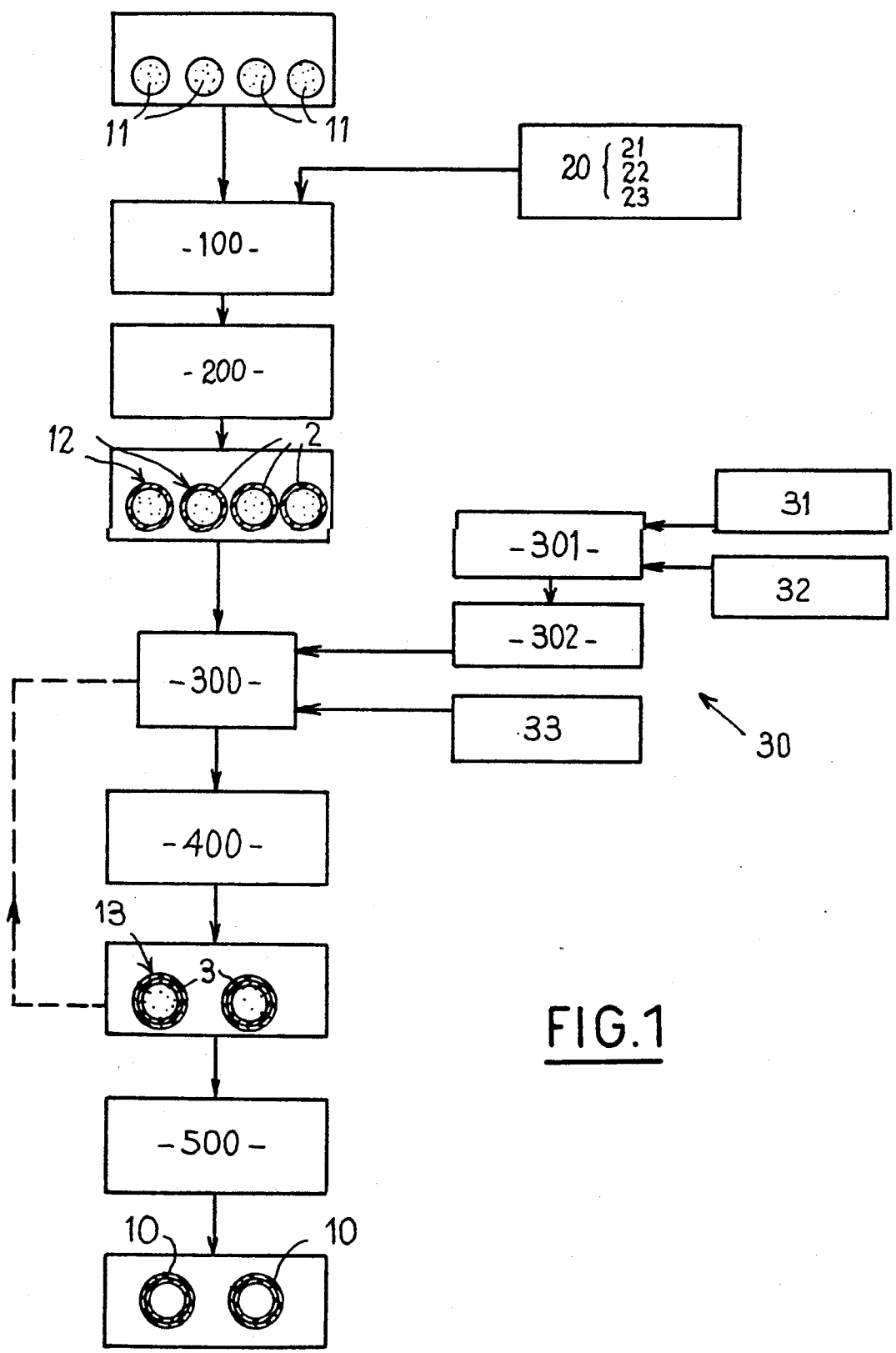

United States Patent [19]

Blottiere et al.

[11] Patent Number: 5,205,976
[45] Date of Patent: Apr. 27, 1993

[54] METHOD FOR THE MANUFACTURE OF HOLLOW SPHERULES OF SYNTHETIC MATERIALS

[75] Inventors: Yves Blottiere, Montauban; Philippe Chapuis, Tournefeuille; Mireille Valaud, Colomiers, all of France

[73] Assignee: Ateca RDM, Montauban, France

[21] Appl. No.: 641,771

[22] Filed: Jan. 16, 1991

[30] Foreign Application Priority Data

Jan. 17, 1990 [FR] France ............................. 90 00484

[51] Int. Cl.⁵ ........................... B28B 1/02; B28B 1/16; B29C 33/40; B29C 33/76
[52] U.S. Cl. ..................... 264/255; 264/256; 264/297.8; 264/300; 264/308; 264/310; 264/317; 264/337; 264/DIG. 44; 264/DIG. 57; 427/212
[58] Field of Search ............. 264/7, 317, 41, 44, 264/49, 255, 256, 300, 308, 297.8, 297.9, 337, 344, DIG. 44, DIG. 57, 112, 113, 301, 310; 427/210, 212

[56] References Cited

U.S. PATENT DOCUMENTS

| H48 | 4/1986 | Heichel | 264/44 |
|---|---|---|---|
| 720,482 | 2/1903 | Richards | 264/317 |
| 3,036,338 | 5/1962 | Nack | 264/7 |
| 3,792,136 | 2/1974 | Schmitt | 264/44 |
| 3,832,426 | 8/1974 | Malthouse et al. | 264/44 |
| 3,840,626 | 10/1974 | Laskawy et al. | |
| 4,025,689 | 5/1977 | Kobayashi et al. | 264/44 |
| 4,211,738 | 7/1980 | Genis | 264/44 |
| 4,218,430 | 8/1980 | Biggerstaff | 264/44 |
| 4,255,197 | 3/1981 | Peralta et al. | 264/317 X |
| 4,307,051 | 12/1981 | Sargeant et al. | 264/44 X |
| 4,407,967 | 10/1983 | Luks | 264/44 X |
| 4,444,894 | 4/1989 | Shaver | 501/90 |
| 4,548,767 | 10/1985 | Hendricks | 264/7 |
| 4,744,831 | 5/1988 | Beck | 264/44 |
| 4,906,423 | 3/1990 | Frisch | 264/317 |
| 5,002,904 | 3/1991 | Jain et al. | 264/29.4 |

FOREIGN PATENT DOCUMENTS

| 119913 | 9/1984 | European Pat. Off. ......... 264/44 |
|---|---|---|
| 170178 | 2/1986 | European Pat. Off. . |
| 2459093 | 6/1975 | Fed. Rep. of Germany . |
| 2079170 | 2/1971 | France . |
| 2151055 | 4/1973 | France . |
| 2256119 | 7/1975 | France . |
| 2521481 | 8/1983 | France . |
| 113808 | 10/1978 | Japan ........................ 264/317 |
| 1095905 | 5/1986 | Japan ........................ 264/317 |

Primary Examiner—Karen Aftergut
Attorney, Agent, or Firm—Sherman and Shalloway

[57] ABSTRACT

The method includes mixing (100) degradable consumable cores (11) with a liquid coating composition (20) including an aqueous solvent (21), a hydrosoluble resin (22) and an anti-agglomerant additive (23), drying (200) the coated cores so as to obtain free balls (12) with a substrate film (2), mixing (300) these balls (12) first of all with a liquid covering substance (30) including a synthetic base product (31) and optionally an auxiliary product (32), then with an anti-agglutinant adjuvant (33), drying (400) the covered balls so as to obtain free ball structures (13) with a covering layer (3), and stoving (500) these ball structures so as to harden their covering layer and degrade the cores and thereby obtain hollow spherules (10). Application in the manufacture of intermediate products for producing in particular energy absorbers.

10 Claims, 3 Drawing Sheets

METHOD FOR THE MANUFACTURE OF HOLLOW SPHERULES OF SYNTHETIC MATERIALS

The present invention relates to the manufacture of intermediate products and more particularly concerns the obtainment of hollow spherules based on synthetic materials.

The invention more particularly provides a method for manufacturing hollow spherules based on synthetic materials, in particular hollow spherules thus obtained, and the application of said spherules as intermediate products in the manufacture of finished products.

In various sectors of industrial activity it has already been proposed to coat granules or particles, preferably of synthetic material, with a covering layer. An application of such a technique in the public works field for producing lightened cements or concretes is, for example, described in the French Patent Application 2,256,119. In this document, it is explained how to coat granules of polystyrene foam first of all with a layer of a water-soluble resin then subsequently with an inert filler so as to obtain granules which are more or less covered which may be incorporated into cements or concrete instead of sand or conventional fine gravel so as to obtain a constructional material of lower density. As will immediately be seen in such a case the coated granules obtained are solid.

A large variety of balls or the like are also found on the market which are solid or hollow, spheroidal, made from synthetic materials and, as the case may be, coated, but all these balls are manufactured by compression or injection moulding and consequently always have a trace of the method employed for obtaining them, in the form of a line or bead in the region of the joint plane or in the form of a stem portion in vertical alignment with the injection passageway. Such a trace which is a source of discontinuity and irregularity is in most cases an inacceptable drawback.

An object of the invention is to obtain hollow spherules from synthetic materials which do not have this type of drawback.

The invention provides a method for manufacturing hollow spherules based on synthetic material with degradable consumable cores. This method is characterized in that it comprises mixing degradable consumable cores with a liquid coating composition comprising an aqueous solvent, a water-soluble resin and an anti-agglomerant and optionally bonding additive, drying the coated cores so as to obtain free balls with a substrate film, mixing said balls first of all with a liquid covering substance comprising a synthetic base product and, optionally, an auxiliary product, and then with an anti-agglutinant adjuvant, drying the covered balls so as to obtain free ball structures with a covering layer, and stoving said ball structures so as to harden their covering layer and degrade the cores and thereby obtain hollow spherules.

The invention also provides hollow spherules obtained in particular by the aforementioned method and the application of the spherules in question in the preparation of discrete granules by coating the spherules with a film of resin including a hardening agent and with an anti-agglutinant powder before hardening said resin.

Figure 2:
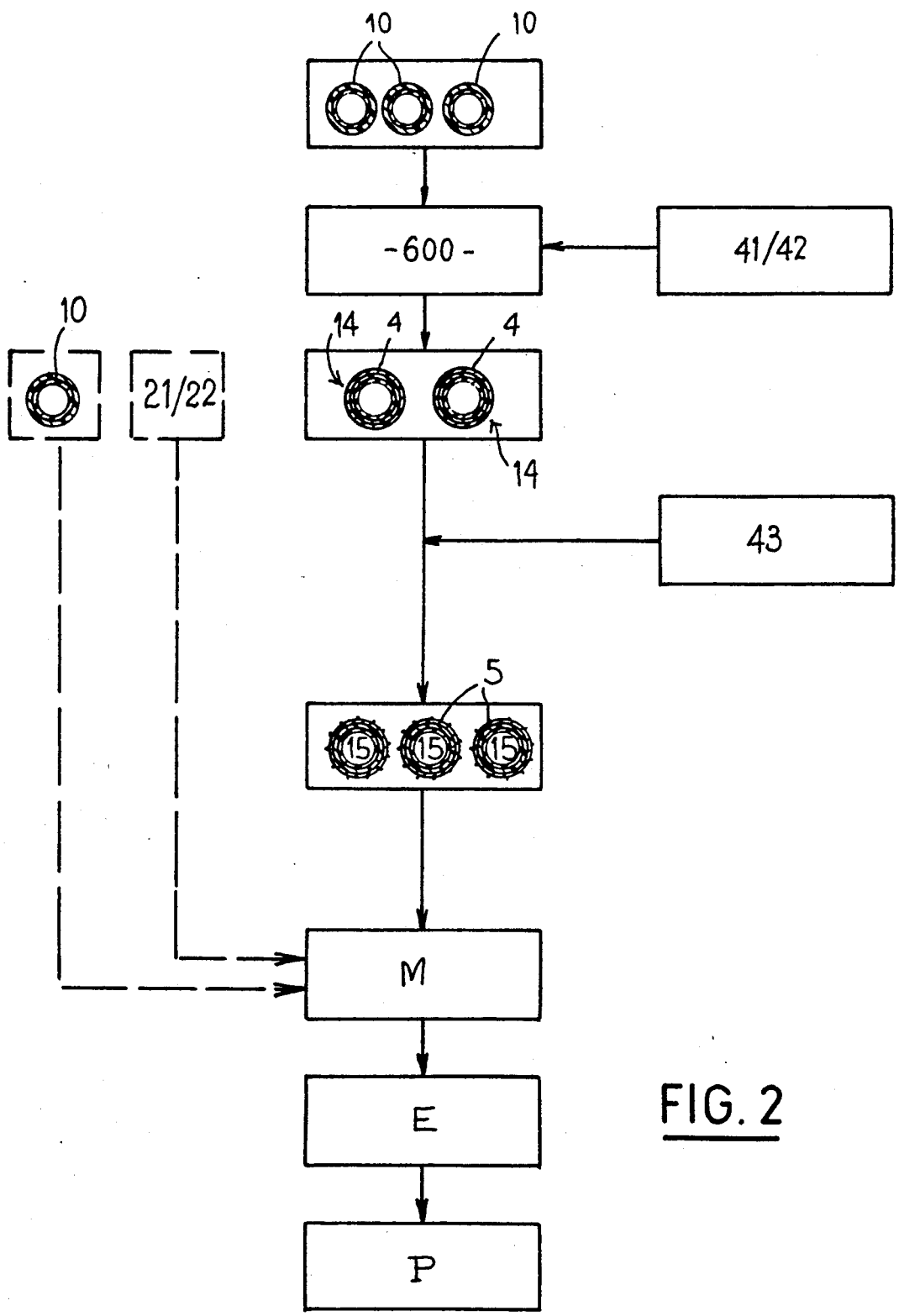
Figure 3:
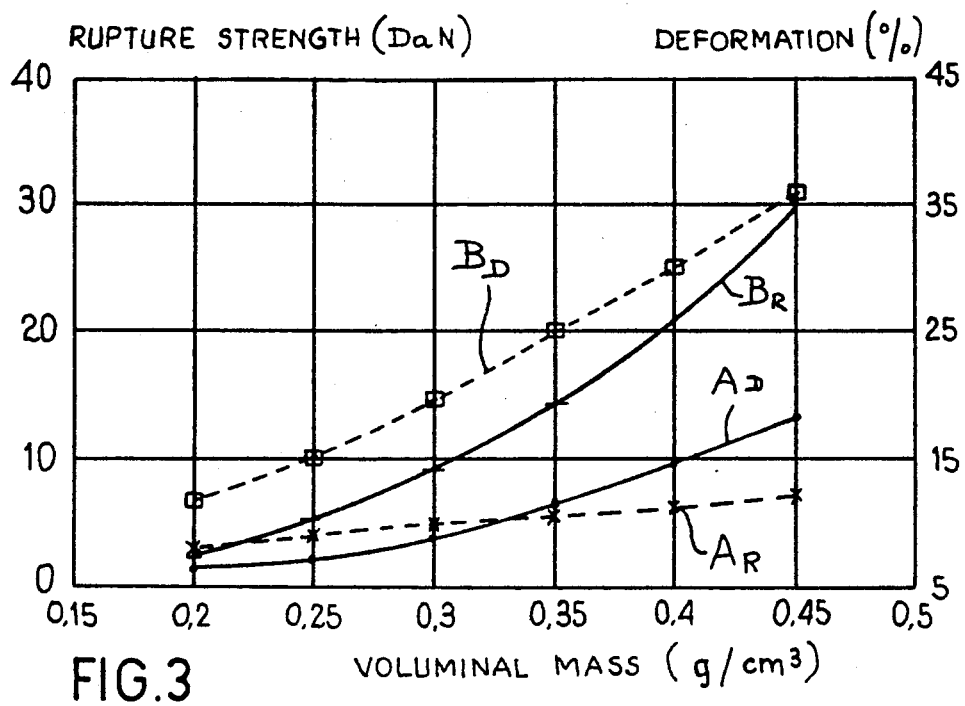
Figure 4:
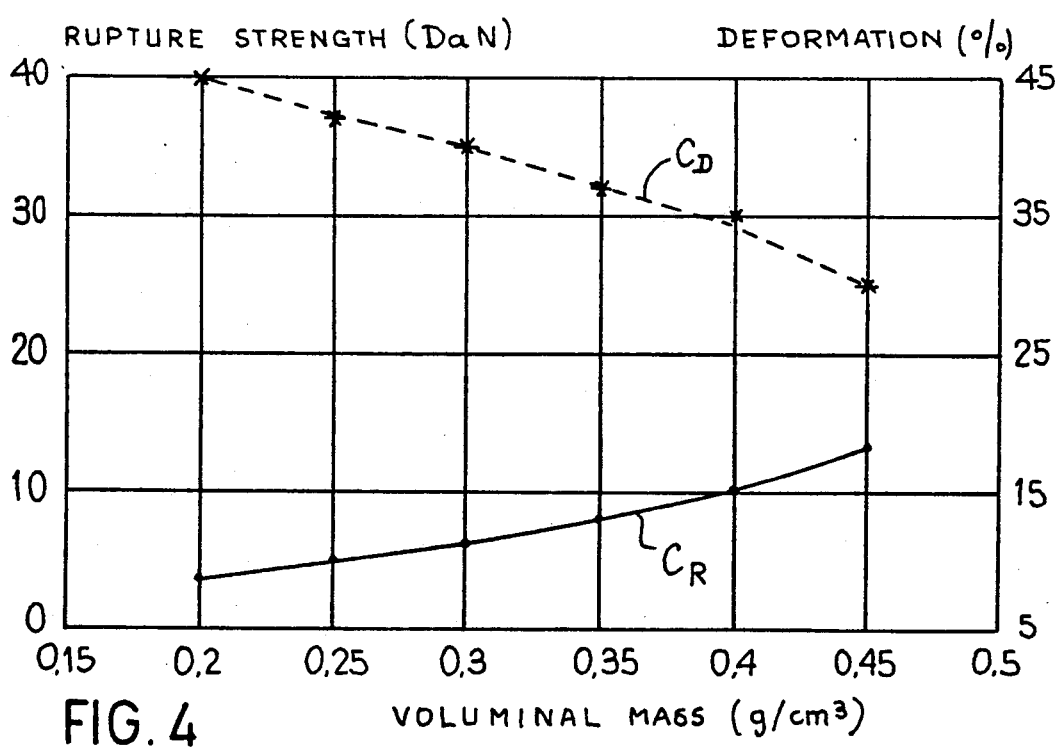

Further features of the invention will be apparent from the following description and claims with reference to the accompanying drawing which is given solely by way of example and in which:

FIG. 1 is a block diagram illustrating how the method of the invention is carried out, FIG. 2 is a similar block diagram concerning the production of the hollow spherules obtained in accordance with the invention, FIG. 3 is a graph illustrating the mechanical behavior of the spherules according to the invention obtained in accordance with two variants, where there is plotted, as abscissae, the voluminal mass in g/cu.cm and, as ordinates, on the left, the rupture strength and, on the right, the relative deformation, and FIG. 4 is a graph similar to that of FIG. 3 of another variant.

The techniques for handling free distinct particles, for example by mixing, malaxating, drying, stoving are well known in the art. This is why these will not be fully dealt with. One skilled in the considered art will draw from conventional current solutions available to him for solving particular problems which may arise.

As can be seen, to obtain hollow spherules 10 of synthetic material according to the invention, one starts with degradable 11, preferably thermodegradable, consumable cores which, for example, shrink under the action of heat.

The cores 11 are coated with a coating composition 20 so as to obtain balls 12 coated with a substrate film 2.

The composition 20 comprises a solvent 21, preferably an aqueous solvent, and a water-soluble resin 22 to which there is added an anti-agglomerant additive 23, optionally that which promotes or improves the "sticking" for reasons which will be understood hereinafter.

The coating composition 20, prepared by any suitable technique, once it has been obtained and homogenized, is added to the cores 11 in a mixer 100. After stirring, the cores pass into a drier 200. At the outlet of the drier there are obtained balls 12 coated with a substrate film 2 of the coating composition.

The balls 12 are then coated with a covering substance 30 so as to obtain ball structures 13 having a covering layer 3.

The covering substance 30 comprises a base product 31, such as a resin, to which there is added an auxiliary product 32, such as a hardener. The base product 31 and the auxiliary product 32 are malaxated together and optionally heated in such manner as to obtain the necessary fluidity. A malaxator 301 and a heater 302 of any suitable type are employed for this purpose.

The balls 12 together with the base product 31 and auxiliary product 32 are then introduced into a mixer 300 and then there is added thereto an adjuvant 33 which is preferably powdered which acts as an anti-agglutinant. After a given period of time, the contents of the mixer are sent to a drier 400 so as to produce ball structures 13 covered with a covering layer 3.

Depending on the thickness of the covering layer 3 to be obtained, the ball structures issuing from the drier 400 are either sent back to the mixer 300 so as to be once more mixed with the covering substance 30, as indicated by the broken line in FIG. 1, or sent to a stove 500.

After a stay of a given duration at a suitably chosen temperature, the contents of the stove 500 are extracted and this yields hollow spherules 10 according to the invention. Indeed, the conditions of the stay of the ball structures 13 in the stove 500 are so chosen as to obtain in particular the degradation of the original cores 11.

These conditions of stay may also be so chosen as to impart to the spherules properties, for example particular and desired mechanical properties.

The coating composition 20 has for purpose, among others, to facilitate the sticking or bonding of the covering substance 30 to the core 11 by means of the substrate film 2 obtained in the case where this substance would not have a spontaneous aptitude for a correct bonding.

The additive 23 and adjuvant 33 have for purpose to oppose the setting of the mass or partial clotting or the like resulting from the sticking together or adherence of the cores, balls and ball structures if they have such an aptitude. In this way, the spherules obtained are free and distinct so as to be capable of flowing in a manner similar to that of a fluid or sand or dry gravel of the same of like particle size.

According to one manner of carrying out the method according to the invention, cores of expanded polystyrene of the order of 5.4 mm in diameter are employed. The coating composition 20 is made from water and a vinyl resin filled with an inert powdered additive such as dolomite, talc. For example, there is employed an adhesive which is known commercially as MURCOOL produced by the firm CLIMATDECOR. It will be clear that there may be employed any type of adhesive or resin compatible with the particular cores employed so long as it does not cause agglomeration. In this manner of carrying out the invention, there is employed a covering substance 30 composed of a base product 31 made from an epoxy resin and an auxiliary product 32 which is its hardener. There are employed for example resin which has the commercial reference LY 5052 and its hardener HY 5052 in the catalogue of the firm CIBA GEIGY. The adjuvant 33 is a polyamide 12 which is named VESTOSINT by the manufacturer HULS. It will be clear that other powdered adjuvants may be employed, such as thermoplastic, thermosetting powders, elastomers, mineral or metallic powders whose grains are wetted by the base product and its auxiliary product.

The method according to the invention is carried out with equipment indicated hereinafter.

The cores 11 are mixed with the coating composition 20 for example in the mixer 100 having a rotating drum whose volume is about five times the volume of the quantity of cores employed. The drum mixer rotates for about 10 min. at the speed of 25 rpm and the coating composition in the proportion of 25 g/l of cores is added thereto.

When the mixture of the cores and coating composition has the required quality, the contents of the mixer 100 are passed into a drier 200 having a stream of hot air whose rate of flow is about 500 l/min of air at a temperature of 60° C. After about 5 min., balls 12 coated with a substrate film 2 are obtained.

Further, there is prepared the covering substance 30 by mixing the base product 31, i.e. the epoxy resin in question, with the auxiliary product 32, i.e. its hardener, in the proportion of 100 parts by weight of resin and 38 parts by weight of the hardener, which is malaxated for about 2 min. in the mixer 301 until perfect homogeneity is achieved, then it is heated in the heater 302 at about 40° C. for about 10 min. so as to lower its viscosity. This covering substance 30 and the balls 12 are placed in the mixer 300 where they are malaxated for around 10 min. before the adjuvant 33 in the proportion of 45 g/l of cores is added thereto. After a uniform mixing for about 20 min., the contents of the mixer 300 are passed into the drier 400 where they stay for about 120 min. so as to accelerate the hardening of the resin.

At the outlet of the drier 400, there are received distinct, well-individualized ball structures 13 covered with a covering layer 3 of on the order of 150 microns of polymer. If necessary, at this stage of the procedure, if it is desired to obtain a thicker covering layer 3, the ball structures 13 are returned to the mixer 300.

When they leave the drier 400, the ball structures 13 are then sent to a rotating drum stove 500 which rotates at the speed of about 5 rpm and in which is developed a rotating heat at between about 80° and 185° C. After a stay of about 30 min., hollow spherules 10 are received at the outlet of the stove 500. Indeed, under the action of the amount of heat received, the consumable cores 11 of the ball structures 13 shrink from an initial diameter of 5.4 mm to about 0.2 mm. These cores may also completely disappear, for example by sublimation.

As mentioned before, by passing the ball structures 13 several times in the mixer 300, spherules may be obtained whose covering layer has the desired thickness.

An examination of the hollow spherules produced in accordance with the described method shows that there are obtained spherules having an outside diameter of about 6.2 mm, a voluminal mass of 0.40 g/cu.cm, a density of 0.26 of the spherules in a heap, a rupture strength in uni-axial compression of 20 daN and a deformation of 30% before rupture.

The graph shown in FIG. 3 illustrates the variations in the rupture strength and deformation before rupture as a function of the voluminal mass of the spherules. The curves represent the behavior of the spherules based on epoxy resin LY 5052 and its hardener HY 5052 and polyamide powder 12 VESTOSINT. The letter A corresponds to a hardening obtained at 20° C. after seven days and the letter B to a hardening obtained at 185° C. after 30 min. The index R designates the rupture and the index D the deformation.

The graph shown in FIG. 4 represents the characteristics C of spherules based on the same resin as before and in respect of which the anti-agglutinant adjuvant is a polyethylene powder named ESCOR EX in the catalogue of the manufacturer EXXON, and the indices have the same signification.

The manufacture of products or finished objects from hollow spherules according to the invention which constitute an intermediate product is easy. Indeed, owing to the very "fluidity" of the spherules, these may be easily placed in a suitable mould M owing to the ease with which they flow, and then fixed, adhered to one another by means of an appropriate adhesive, resin or the like, so as to obtain the object of the required configuration.

For this purpose, there may be employed for example the previously-mentioned epoxy resin. After stoving at 60° C. for one hour in a stove E, the coating composition is hardened and it is possible to strip the part made from spherules according to the invention from the mould P. This is illustrated in FIG. 2 in broken lines. In another variant of the use of these spherules, there are employed hollow spherules according to the invention which are ready for use with no necessity to add an adhesive or the like thereto.

For this purpose, there are taken hollow spherules obtained as mentioned hereinbefore from the outlet of the stove 500 and they are covered with a thin film 4 of a resin 41 in a mixer 600 so as to obtain granules 14. There is for example employed as resin 41 an epoxy resin and as hardener 42 the previously-mentioned hardener to which are added an anti-agglomerant powder 43, for example polyethylene designated by the commercial name GOTALENE in the catalogue of the manufacturer CONTINENTAL PARKER. It is also possible to use any other thermoplastic powder whose type and grain size render incomplete the wetting by the resin. In this particular case, 20 grams of resin per liter of spherules are employed to which 40 grams of powder per liter of spherules are added. The hardening of this resin is obtained within 24 hours at ambient temperature. The pearls 15 thus prepared are characterized by their surface formed by a layer 5 which is constituted by grains of powder embedded in the resin but not covered by the latter.

In this way, an intermediate product ready for use is obtained which may be used for producing a material with no necessity to add another resin thereto. The pearls 15 thus obtained may be poured into a mould M and, after stoving at 180° C. for 30 min. in a stove E, the flowing quality of the powder ensures the connection between the spherules. This is illustrated in FIG. 2 in full lines. In the Figures of the drawing, the thicknesses of the substrate 2, covering 3, film 4 and layer 5 are not shown to scale but are highly exaggerated merely to facilitate the illustration and the understanding of the invention.

It is clear from the foregoing that the spherules according to the invention are isotropic and have a regular and continuous outer surface without the slightest discontinuity, whether this surface be smooth or otherwise. Furthermore, the spherules thus obtained may be subjected to subsequent operations, for example to heating, physical or chemical treatments, so as to impart thereto particular special properties and/or aptitudes, for example properties of rigidity, hardness, elasticity, electric conductivity, roughness, etc.

The real interest of the technique according to the invention will be understood, this technique permits providing an intermediate semi-product formed by hollow spherules composed of synthetic materials which may serve, for example, to produce absorbers or dampers of mechanical energy or sound-absorbing panels.

What is claimed is:

1. Method for manufacturing hollow spherules from synthetic materials by coating degradable consumable cores, comprising the steps of:
    (i) mixing degradable consumable cores with a liquid coating composition comprising an aqueous solvent, a water-soluble resin and an anti-agglomerant additive;
    (ii) drying said coated cores so as to obtain free balls with a substrate film;
    (iii) mixing said balls first of all with a liquid covering substance comprising a hardenable resin and then with an anti-agglutinant adjuvant;
    (iv) drying said balls thus covered so as to obtain free ball structures with a covering layer; and
    (v) stoving said free ball structures so as to harden said covering layer and degrade said cores and thereby obtain hollow spherules.

2. Method according to claim 1, wherein said anti-agglomerant additive is also a bonding additive.

3. Method according to claim 1, wherein said liquid covering substance further comprises a hardening agent for said hardenable resin.

4. Method according to claim 1, further comprising recycling said ball structures, formed in step (iv), to step (iii) so as to increase a thickness of said covering layer.

5. Method according to claim 1, wherein said cores are thermodegradable.

6. Method according to claim 5, wherein said cores are thermoshrinkable.

7. Method according to claim 1, wherein said cores are composed of expanded polystyrene.

8. Method according to claim 1, wherein said liquid coating composition comprises water as said solvent, a vinyl resin as said water-soluble resin, and an inert mineral powder as said additive.

9. Method according to claim 3, wherein said covering substance comprises said hardenable resin intimately mixed in a homogeneous manner with said hardening agent, and said anti-agglutinant adjuvant comprises a polyamide powder.

10. Method according to claim 9, wherein said hardenable resin and said hardening agent are employed in a proportion of 100 parts by weight of said resin to 38 parts by weight of said hardening agent, and said anti-agglutinant adjuvant is employed in a proportion of 45 g per liter of cores.

* * * * *